United States Patent [19]
van Swam

[11] Patent Number: 5,247,551
[45] Date of Patent: Sep. 21, 1993

[54] SPACER SLEEVE FOR NUCLEAR FUEL ASSEMBLY

[75] Inventor: Leo F. van Swam, Richland, Wash.

[73] Assignee: Siemens Power Corporation, Richland, Wash.

[21] Appl. No.: 764,585

[22] Filed: Sep. 24, 1991

[51] Int. Cl.⁵ .............................................. G21C 3/32
[52] U.S. Cl. .................................. 376/441; 376/438; 376/439; 376/446
[58] Field of Search ............... 376/441, 446, 438, 462, 376/439, 442, 261; 976/DIG. 83, DIG. 66, DIG. 69

[56] References Cited

U.S. PATENT DOCUMENTS

| | | | |
|---|---|---|---|
| 3,314,860 | 4/1967 | Wilman | 176/78 |
| 3,607,642 | 9/1971 | Murdock | 376/447 |
| 3,674,638 | 7/1972 | McGregor | 176/81 |
| 3,746,617 | 7/1973 | Iwao et al. | 176/78 |
| 3,791,466 | 2/1974 | Patterson et al. | 376/441 |
| 3,820,225 | 6/1974 | Iwao et al. | 29/428 |
| 3,820,226 | 6/1974 | Nakazato | 29/428 |
| 3,920,516 | 11/1975 | Kmonk et al. | 376/441 |
| 3,996,101 | 12/1976 | Marmonier et al. | 376/441 |
| 3,997,395 | 12/1976 | Cayol et al. | 176/78 |
| 4,056,441 | 11/1977 | Marmonier et al. | 376/441 |
| 4,240,876 | 12/1980 | Delafosse | 176/78 |
| 4,313,797 | 2/1982 | Attix | 376/441 |
| 4,508,679 | 4/1985 | Matzner et al. | 376/438 |
| 4,645,643 | 2/1987 | Leclercq | 376/447 |
| 4,678,630 | 7/1987 | King et al. | 376/438 |
| 4,692,303 | 9/1987 | Osborne | 376/446 |
| 4,772,447 | 9/1988 | Manson et al. | 376/441 |
| 4,800,061 | 1/1989 | Shallenberger et al. | 376/261 |
| 5,112,571 | 5/1992 | Orii et al. | 376/439 |

FOREIGN PATENT DOCUMENTS 1944932 5/1970 Fed. Rep. of Germany .
3325777 2/1984 Fed. Rep. of Germany .

Primary Examiner—Donald P. Walsh
Assistant Examiner—Meena Chelliah
Attorney, Agent, or Firm—Ira Lee Zebrak

[57] ABSTRACT

A spacer sleeve for positioning and restraining a nuclear fuel rod in a nuclear fuel assembly, having a thin walled tubular member having an inner wall and an outer end, and extending a height from a lower end to an upper end and being positioned around the fuel rod to form an unrestricted coolant flow passage along the height of the tubular member, the flow passage having a cross-sectional flow area formed between the fuel rod cladding and the inner wall of the tubular member, and a thin tab extending from the tubular member into the unrestricted flow area and secured to a portion of the cladding of the fuel rod.

17 Claims, 6 Drawing Sheets

SPACER SLEEVE FOR NUCLEAR FUEL ASSEMBLY

BACKGROUND OF THE INVENTION

This invention relates to fuel elements for nuclear reactors, and more particularly to braces, spacers, or support lattices which are usually placed at predetermined distance(s) along the length of the fuel elements in order to provide lateral bracing and spacing, and to maintain the fuel elements in fixed positions.

In a nuclear reactor, the reactor core contains nuclear fuel which is typically in the form of fuel rods grouped together in fuel assemblies. The fuel assemblies are usually mechanically identical and can therefore, be interchangeable. Groups of fuel assemblies are arranged into a matrix to form a core capable of controlled fission reaction.

Each fuel rod is typically a long member approximately 0.4 inches in diameter and 8 to 15 feet long containing fuel usually in the form of a stack of fuel pellets which are surrounded by tubular cladding. The fuel rods which make up an assembly are grouped together to form a plurality of longitudinally extending members which are supported vertically by two parallel end plates, an upper and a lower tie plate. These plates are usually connected to one another by tie rods, or other structural elements.

Each fuel assembly or bundle may also include non-fuel bearing members. Examples include guide tubes to form passageways for control rods which assist in controlling the rate of fission, instrumentation tubes for in-core instrumentation, spacer capture rods, and water rods to modify the neutron moderation in the assembly. The spaces between adjacent fuel rods create flow channels through which coolant and/or moderator can circulate. In light water reactors, the coolant and moderator is water. Lateral bracing and spacing of the fuel rods in the fuel assembly are provided by spacers or spacer grids.

The fuel assembly or bundle, whether in a pressurized water reactor, boiling water reactor, high temperature gas cooled reactor, or any other type of reactor, functions in part to maintain the fuel rods in a fixed position, ideally free of vibration and restrained from bowing or other movement during normal and other operating conditions. In addition, by maintaining the fuel rods in fixed positions, proper cooling and neutron moderation can be achieved. Devices that assist in maintaining the fuel rods in fixed positions in the fuel assembly or bundle and which thereby facilitate proper fuel cooling are spacers.

Spacers or spacer grids which provide lateral bracing are typically designed to allow differential axial expansion of the fuel rods. Springs incorporated in the spacer grids are most frequently used to permit some sliding of the fuel rods with respect to the spacer grids. In some of the designs, the spacer grid is free to move axially a small amount to accommodate minor changes in the axial length of the fuel rods during irradiation.

If spacers wee to be rigidly connected to the fuel rods as well as to structural members of the fuel assembly, then relative axial movement due to rod growth and thermal expansion of adjacent rods can cause local fuel rod skewing and bowing.

By being positioned at regular intervals, spacers maintain rod-to-rod spacing along the length of the fuel assembly. Spacers are typically made of zirconium based alloy sheet material or sometimes from Inconel or stainless steel, and are built up from a relatively large number of different intricately shaped strips that are fitted together by hand and subsequently welded. Sometimes, short sections of tubing are used that are welded to one another along parts of their edges. The spacers have an egg crate shape and each spacer cell includes dimples and/or springs to maintain the desired rod-to-rod spacing. Thus, the springs and dimples keep the fuel rods in their proper lateral positions. But, under the influence of irradiation, the springs are prone to relax and this can lead to undesirable changes in fuel rod pitch (i.e. rod-to-rod spacing) or it may cause gaps or spaces to develop between fuel rods and the springs and dimples, and increases the likelihood that the rods and/or spacer grids will vibrate. Such gaps, changes in fuel rod pitch, and vibration may lead to fuel rod fretting and failure.

Springs necessarily contact the fuel cladding and can cause fretting even if they are not subject to relaxation. Furthermore, as the fuel is irradiated, the fuel rods undergo a shrinkage or diameter reduction known as "creepdown" which can result in gaps between the fuel rod cladding and the springs or dimples which in turn can cause or contribute to fuel rod fretting.

Since even the slightest repeated relative movement between contacted fuel rods and spacers can result in fretting of the fuel cladding, minimization of such relative movement is desired. Thus, loads due to thermal expansion of fuel rods, particularly fuel cladding, and associated tensile loads from such expansion must be considered in spacer design.

Spacers should be thin members and have minimal cross-sectional area. Ideally, they are invisible to moderator and coolant flow. Spacer designs which reduce the flow area, also increase flow resistance and restrict coolant flow causing undesirable pressure drops. Thus, the particular physical configuration of a spacer can create or contribute to local or even non-local undesirable flow redistribution, restriction, or distortion.

Typically, the fabrication of spacers requires extensive labor in shaping the separate parts and in assembling and welding these parts to form a spacer grid. Many of these operations can be automated. However, even with automated spacer fabrication, assembly and welding, extensive labor is required in inserting the fuel rods through the spacers to form a fuel bundle. Even with simplified spacer designs, the assembly of spacer and fuel rods is intricate, time consuming and costly. Whenever spacer designs include springs and/or dimples, even non-intricate assembly techniques become particularly labor intensive. Labor costs can be substantial, particularly in light of the rigorous quality control standards that are applied to nuclear reactor components. When spacer design and fuel rod-spacer assemblies include spring or dimple elements, assembly of the fuel rods into a fuel bundle often result in scratching or damaging the fuel rod cladding surface which may lead to rejection of fuel assemblies during pre-operational quality control tests and inspections and/or fuel rod cladding failures during reactor operation.

It would thus be an advantage if spacers did not include springs and dimples or similar contact devices which relax from irradiation.

It would be an additional advantage to limit the repeated relative movement between spacers and the contacted fuel rod cladding.

It would be a further advantage if the actual physical connection between each spacer and fuel rod was not mechanical but was welded, fused, or bonded thereby avoiding the possibility of fretting of the fuel cladding by its spacer.

It would be a further advantage if the effective coolant flow area surrounding each fuel rod is maximized by minimizing the spacer cross sectional surface area which impedes coolant flow.

It would be yet a further advantage if the flow characteristics of a completed fuel assembly with fuel rod spacers could be improved by providing effectively unhindered coolant (e.g. water and steam) flow along the length of the fuel rod between the fuel cladding and its spacer and unhindered coolant flow within the area in the center of adjacent spacers by keeping the center free from any restrictions.

It would be a further advantage to minimize radial changes in the spacer structure in order to minimize changes in the pitch of the fuel rods which may affect the neutronic and thermal performance of the assembly.

It would be yet another advantage if spacers could be made of materials having low neutron cross section as well as having small mass.

It would be an advantage if each fuel rod was connected to its own spacer which remained integral with the fuel rod.

It would be an advantage if each fuel rod/spacer was mechanically identical.

It would be an advantage if the spacers were not rigidly connected to one another but were left free to move in the axial direction and thereby accommodate rod growth and thermal expansion differences between adjacent fuel rods.

It would also be an advantage if the spacer is not connected to the fuel assembly tie or spacer capture rod or to the guide tubes or other structure members so that axial movement of the rods is unrestricted and axial forces are not exerted on the rods thereby minimizing fuel rod bow.

It would also be an advantage if a portion of the spacer could deform in order to accommodate the reduction in diameter of the fuel rods due to creep without changing the distance between the spacer and fuel rod cladding as well as the distance between adjacent spacers.

It would be yet a further advantage if the fuel rod surface would not be exposed to any spacer parts that may cause fretting and if any fretting is to take place, that it would occur on the spacers and not the fuel rods.

It would be an additional further advantage if a spacer having each of the above advantages could be fabricated, tested and inspected at a lower cost than conventional spacers and at the same time improving overall quality and reliability.

It would be another advantage to have spacers which could be attached to and form a sleeve around fuel rods and avoid the prior art method of inserting the fuel rods through and interlacing with the spacer grids.

It would be yet a further advantage if each fuel rod and its integral spacer was such that their assembly into a fuel bundle merely involved stacking of individual fuel rods one on top of another without scratching any of the fuel rods.

SUMMARY

These and other objects of the invention are achieved by providing a spacer sleeve for positioning and restraining a nuclear fuel rod in a nuclear fuel assembly, the sleeve having a thin walled tubular member having an inner wall and an outer wall, the tubular member extending a height from a lower end to an upper end and being positioned around the fuel rod to form an unrestricted coolant flow passage along the height of the tubular member, the flow passage having a cross-sectional area formed between the fuel rod cladding and the inner wall of the tubular member, and a flexible thin tab extending from the thin walled tubular member into the unrestricted flow area and secured to a portion of the cladding of the fuel rod.

The objects of the invention are also achieved by providing a nuclear fuel assembly using a system of spacer sleeves.

BRIEF DESCRIPTION OF THE DRAWINGS

The foregoing and other features of the invention will be more readily apparent from the following detailed description and drawings of illustrative embodiments of the invention in which.

DESCRIPTION OF ILLUSTRATIVE EMBODIMENTS

Figure 1:
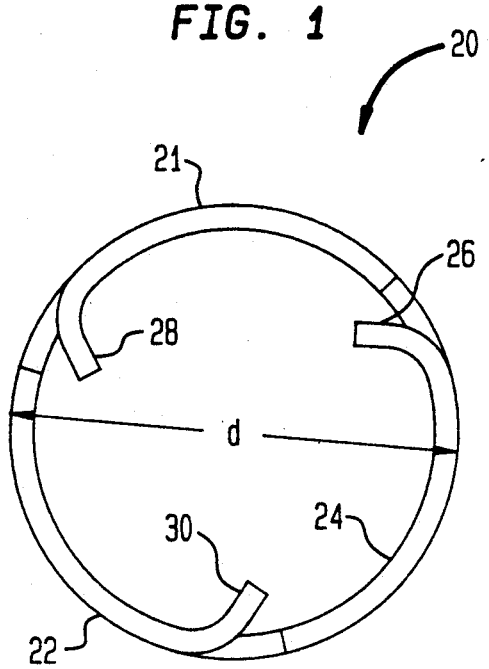
FIG. 1 is an enlarged top view of the fuel rod tubular sleeve.
Figure 2:
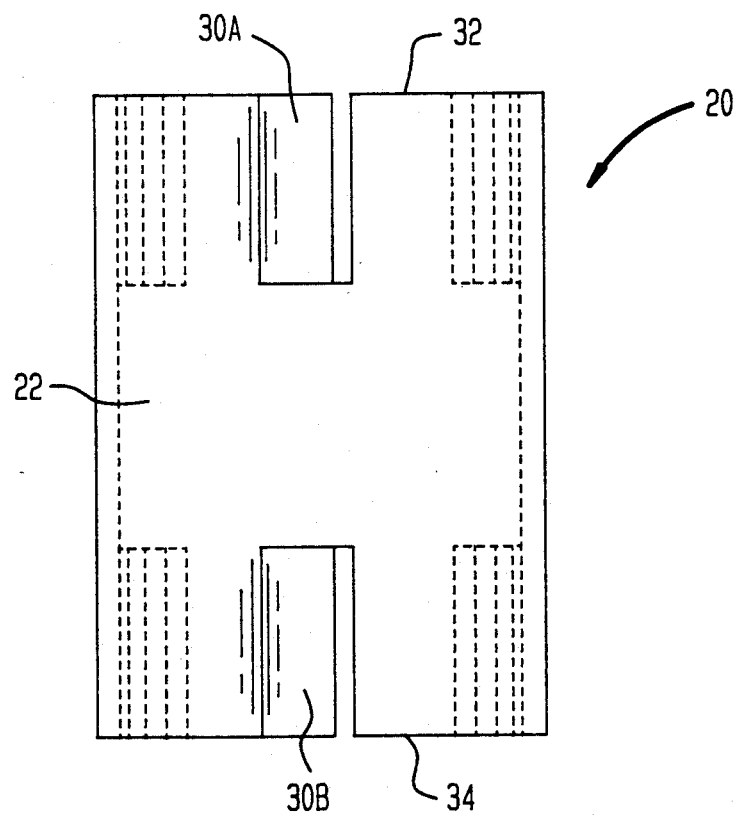
FIG. 2 is an enlarged side elevational view of the fuel rod sleeve shown in FIG. 1.

According to the present invention as shown in FIG. 1, spacer sleeve 20 having outer diameter d is shown in a top view. Spacer sleeve 20 is a generally hollow cylinder 21 having outer wall 22, inner wall 24, and inwardly directed tabs 26, 28, 30 formed from the walls of the cylindrically shaped spacer sleeve 20 by cutting the desired shape of the tab into the wall of cylinder 21 and bending the resulting tab inwards. These tabs are positioned at an equal number of degrees around the axis a of cylinder 21 on the top and bottom edges 32, 34. As can more readily be observed from FIG. 2, the inwardly directed tabs 26, 28, 30 shown in FIG. 1 are each a pair of tabs (26A, 26B, 28A, 28B, 30A, 30B) formed along top edge 32 and bottom edge 34 of spacer sleeve 20. Inwardly directed tabs 30A and 30B are shown in FIG. 2 whereas tabs 26A, 26B, 28A, 28B are shown in phantom. Although not shown, any number of tabs can be positioned anywhere on the wall of the cylinder as well as an unequal number of degrees around axis a. Nor must the inwardly directed tabs be in pairs.

Figure 3:
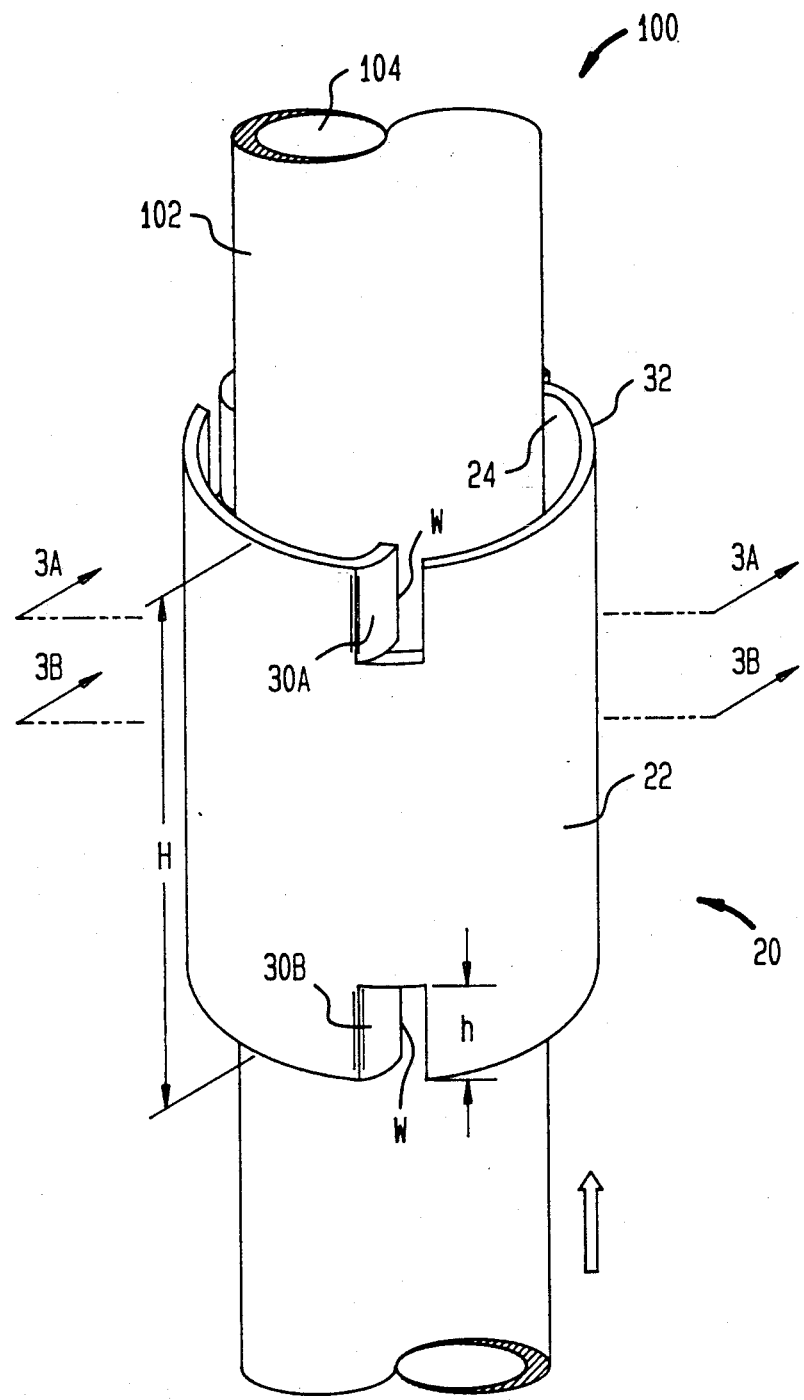
FIG. 3 is an enlarged perspective view showing the sleeve shown in FIGS. 1 and 2 in its final installed position connected to a fuel rod.

Spacer sleeve 20 is shown in FIG. 3 positioned around cylindrical fuel rod 100 which has cladding 102 surrounding uranium fuel 104. Inwardly directed tabs 30A and 30B (as well as 26A,B and 28A,B, although not shown) contact fuel cladding 102 at W where each of the tabs and the cladding are welded, brazed or otherwise bonded together. Spot welding, laser welding, electron beam welding or resistance welding can be used to fasten the sleeves to the fuel rods as described for example in U.S. Pat. No. 4,692,303 assigned to Advanced Nuclear Fuels Corporation and hereby incorporated by reference. Brazing pads or other appendages to fuel rods is also well known as for example described in U.S. Pat. No. 3,674,638 issued on Jul. 4, 1972 to McGregor for a Nuclear Reactor Fuel Element Assembly which is also hereby incorporated by reference. Diffusion bonding or other solid state bonding processes although not frequently used up until now, could be used as well to attach the sleeves to the fuel rods.

Thus, the welding or bonding of tabs 30A,B, 26A,B 28A,B to cladding 102 provides a bond, which by its nature does not promote, and indeed prohibits spacer 20 from rubbing against cladding 102 which could have caused fretting and lead to fuel rod perforation and to the concomitant contamination of the coolant from escaped fission products.

Spacer sleeve 20 is a thin member made from material having a low thermal neutron cross section such as zircaloy or another zirconium base alloy and is typically about three quarters to one inch in length but could be longer or shorter depending upon the application. The outer diameter of the sleeve is usually equal to the fuel rod pitch employed in the particular reactor type and particular fuel rod and fuel assembly design. The wall thickness of the sleeve is typically between 0.010 and 0.020 inch.

Figure 6A:
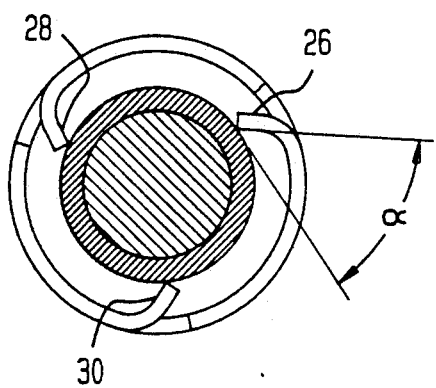
FIG. 6A is an enlarged sectional view of a tubular sleeve connected to the fuel rod by welded tabs forming an angle with the fuel rod surface.
Figure 6B:
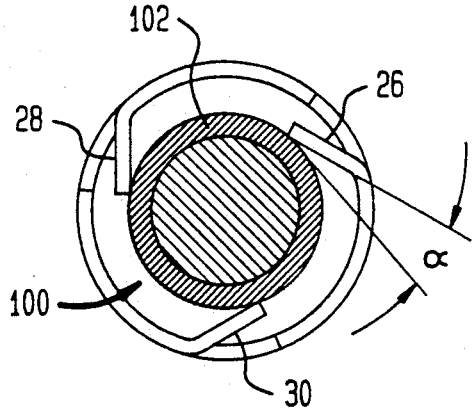
FIG. 6B is an enlarged sectional view of another tubular sleeve with welded tabs forming an angle and welded tangentially with the fuel rod surface.
Figure 6C:
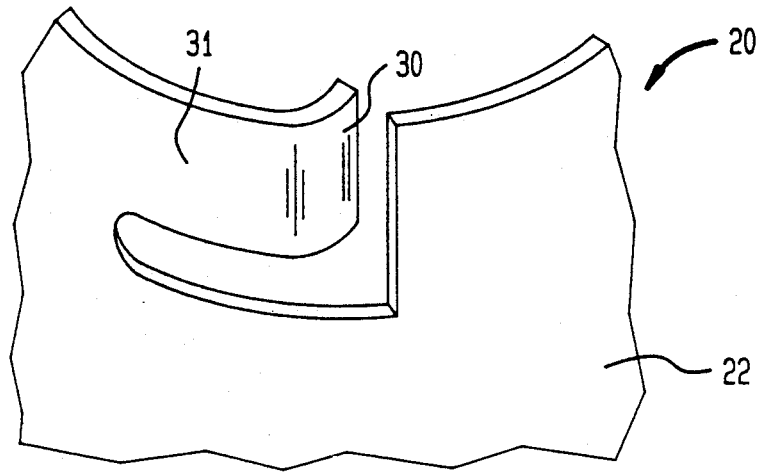
FIG. 6C is an enlarged perspective partial view of a welding tab and undercut.

Spacer sleeve 20 does not employ a spring or other type of contact device which would relax from irradiation during reactor operation. Thus, proper functioning of spacer sleeve 20 to maintain rod-to-rod spacing does not depend on springs. During the course of reactor operation, the reduction in the diameter of fuel rod 100 due to creep can be accommodated by the flexing capability of the inwardly directed tabs 26, 28, and 30 without impairing the integrity of the welds. Flexing of the tabs can be more readily accommodated if the tabs are undercut as shown in FIG. 6C. It should also be noted that the spacing between inner wall 24 of spacer sleeve 20 and cladding 102 remains substantially the same notwithstanding the fuel rod diameter reduction due to creep. The diameter of the spacer sleeve will only be changed minimally due to irradiation effects. In contrasts to fuel rods, the spacer sleeves will not be deformed by creep and be reduced in diameter since there is no pressure differential between spacer sleeve inner and outer diameters. In addition, the small amount of play between adjacent spacer sleeves that may be present after fabrication of the fuel assembly is therefore not expected to change during the assembly life time.

It is apparent that because spacer sleeve 20 is an integral part of fuel rod 100, any axial movement of fuel rod 100 produces a concomitant movement of spacer sleeve 20. Thus, adjacent spacer sleeves, as contrasted to fuel rod cladding, might be caused to rub against one another and therefore become subject to wear (FIG. 4A). The area of contact between adjacent spacer sleeves is substantially larger than that between fuel rods and conventional spacer springs and dimples. Any wear, therefore, is very much smaller than that which may be observed in conventional designs. Furthermore, because of the different functions of a spacer sleeve as contrasted to fuel cladding, minor spacer sleeve wear is not of concern.

Figure 3A:
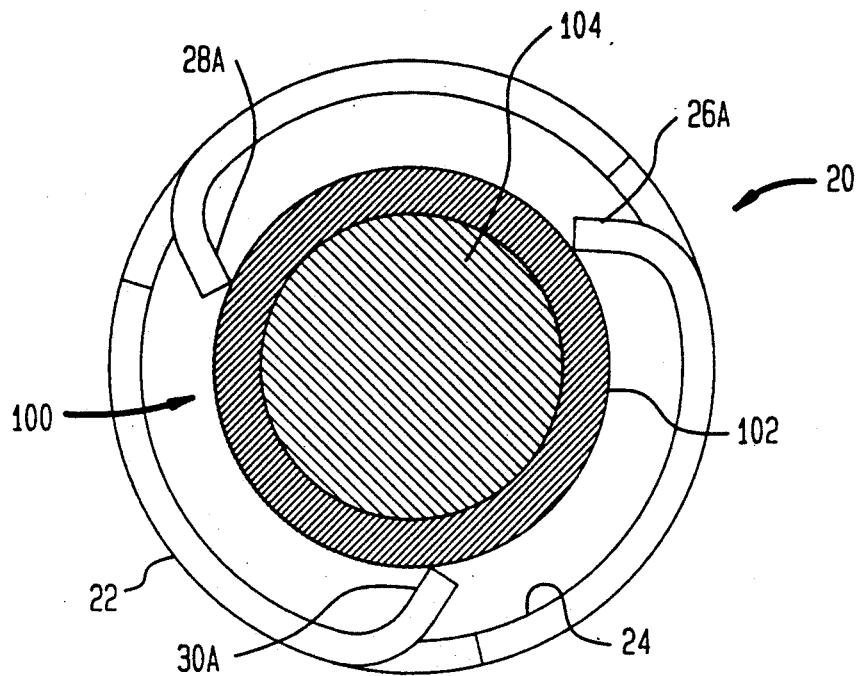
FIG. 3A is a cross-sectional view taken along lines 3A of the spacer and fuel rod shown in FIG. 3.
Figure 3B:
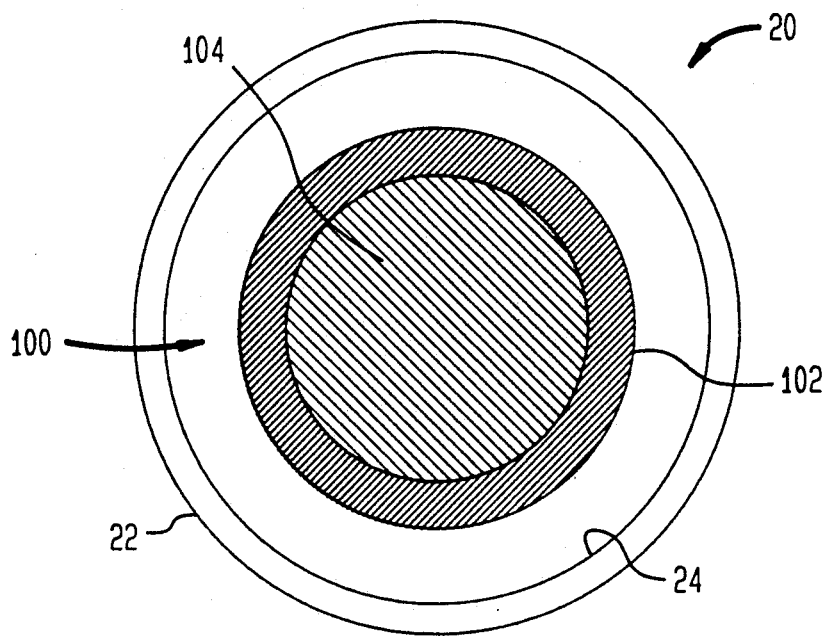
FIG. 3B is a cross-sectional view taken along lines 3B of the spacer and fuel rod shown in FIG. 3.

FIGS. 3A, 3B show the cross-sectional area of the flow areas between inner wall 24 of spacer sleeve 20 and fuel rod cladding 102. FIG. 3B shows that there is unhindered flow of water and steam in the flow area between the cladding and spacer sleeve. Similarly, the heat transfer capabilities of the portion of fuel rod along the length of the spacer sleeve is maximized in this region because all of the fuel rod surface area is available to transfer heat to the coolant. As contrasted to the unrestricted flow area shown in FIG. 3B, the flow area in FIG. 3A is decreased by the cross-sectional area of tabs 26A, 28A, and 30A which is approximately 2% of the total flow area assuming 10 to 20 mils thickness of tabs and sleeve. Because each pair of tabs (26A,B; 28A,B; 30A,B) can be positioned to be aligned with one another along the sleeve height, spacer sleeve 20 offers insignificant flow resistance to water and steam along the length of that portion of the fuel rod which corresponds to the height H of the spacer. Furthermore, because spacer sleeve 20 has minimal restrictions to the flow of coolant, acceleration and deceleration of coolant flow as well as pressure drop across the height of the spacer sleeve is minimized. Since the tabs are welded, brazed or otherwise bonded onto the fuel rod cladding, they will aid in the heat removal from the fuel rod similar to cooling fins specifically made for this purpose in many other heat transfer devices.

Figure 4:
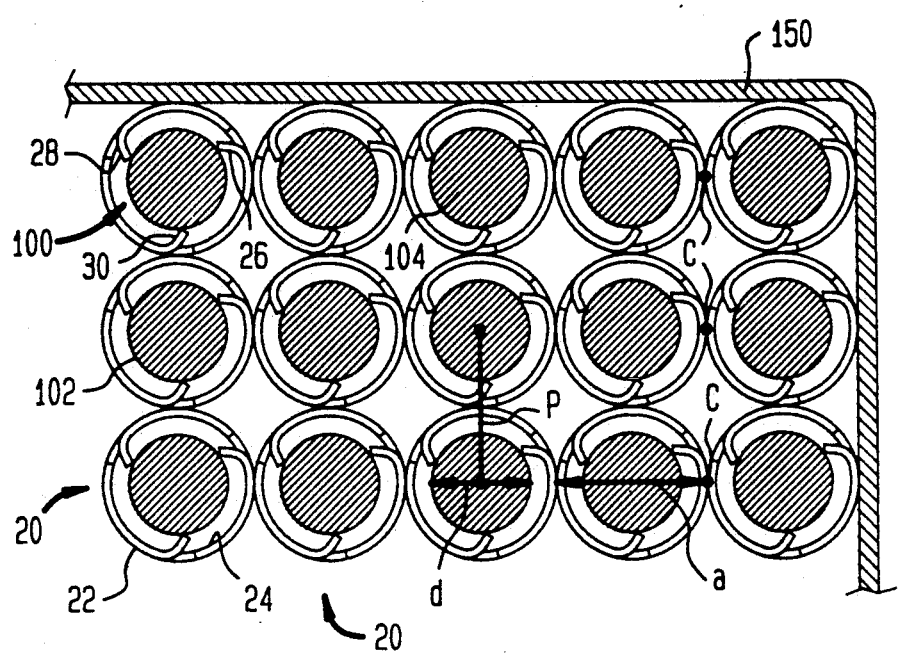
FIG. 4 is an enlarged cross-sectional view of an incomplete fuel assembly showing the position of several assembled fuel rods and their respective tubular sleeves.
Figure 4A:
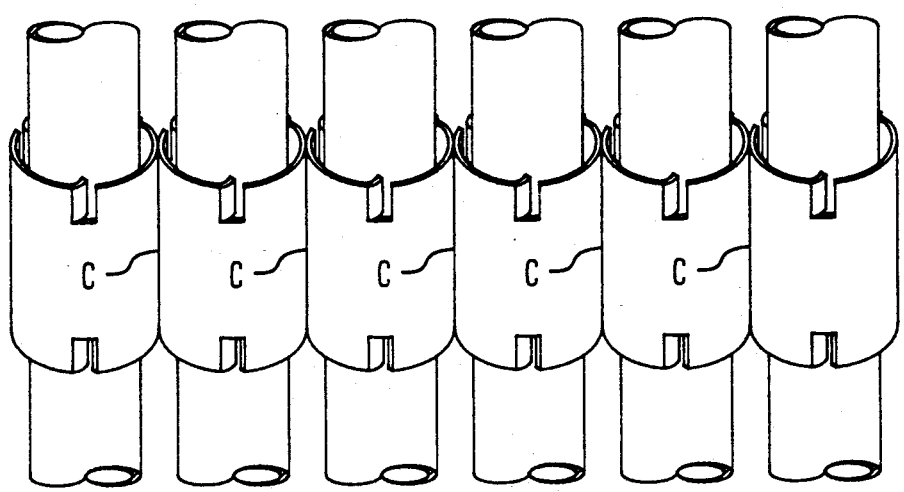
FIG. 4A is a perspective view of a portion of the incomplete fuel assembly of FIG. 4.

FIG. 4 is a cross-sectional view of a group of fuel rods together with their integral individual spacer sleeves stacked together to form a portion of a fuel bundle. Each spacer sleeve is shown in contact C with adjacent spacer sleeves. Since fuel rods 100 are centered within spacer sleeves 20, the fuel rod pitch P is identical to the outer diameter a of the spacer sleeve. The areas of contact C between adjacent spacers can be seen in FIG. 4A. Thus, fretting, if it occurs, will occur at the contact surfaces C of spacers 20 and not at the surface of fuel cladding 102.

Figure 7:
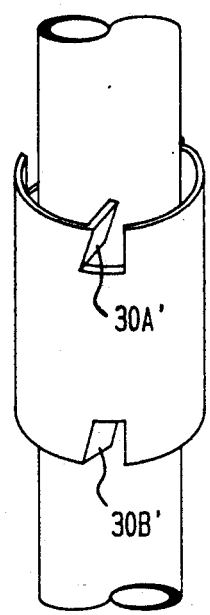
FIG. 7 is an enlarged perspective view showing an alternative embodiment in which the sleeve shown in FIG. 3 has angled weld tabs connected to a fuel rod.
Figure 8A:
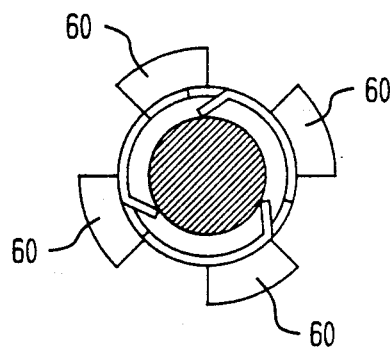
FIG. 8A is a cross-sectional view showing yet a further embodiment in which vanes are shown extending from the spacer.
Figure 8B:
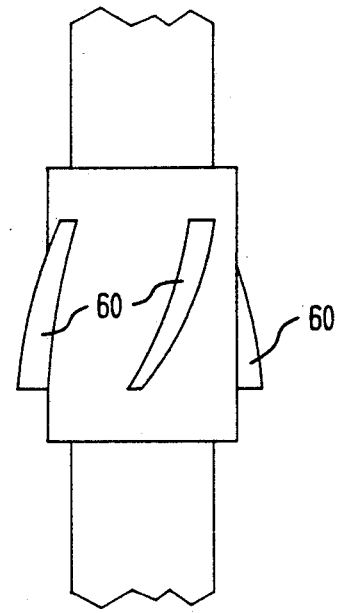
FIG. 8B is an enlarged side view of the sleeve with the vanes shown in FIG. 8A.

In an alternative embodiment, inwardly directed tabs 26, 28, 30 formed from the walls of the spacer sleeve 20 can be bent in such a manner that they form an angle with the fuel rod axis as shown in FIG. 7. Such angled weld tabs 26A', 26B', 28A', 28B' (not shown) and 30A', 30B' act as vanes and impart a twisting or helical motion to the coolant flow. This twisting or helical motion of the coolant flow increases the heat transfer from the fuel rod to the coolant. Similarly, vanes 60, in place of or in addition to, angled weld tabs, extend from the sleeve as shown in FIGS. 8A and 8B and further promote helical flow patterns. Vanes 60 formed from separate pieces of zircaloy or other suitable alloy are welded or brazed onto the sleeve. Alternatively, vanes 60 are punched or cut out of the sleeve. Although vanes 60 are shown in FIGS. 8A and 8B pointing outwards from the sleeve and away from the fuel cladding, they could alteratively point inwards towards the fuel rod cladding as well.

Figure 5:
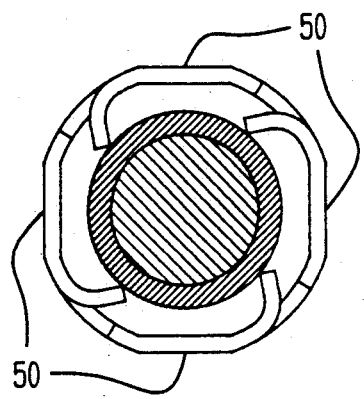
FIG. 5 is an enlarged sectional view of a second embodiment of a fuel rod sleeve connected to a fuel rod.

In an alternative embodiment of the present invention which is shown in FIG. 5, flat surfaces 50 are provided on the outer surface 22 of spacer sleeve 20 which increases the contact area C between adjacent sleeves. Since the surface area of contact C between adjacent spacer sleeves increase, the tendency for spacer fretting is reduced even further.

The spacer sleeves 20 are not rigidly connected to one another but are free to move in the axial direction to accommodate rod growth and thermal expansion differences between adjacent fuel rods. As shown in FIG. 4, a strap 150 made of zircaloy or other suitable material could be positioned around the outer fuel rod-spacers to maintain the generally square or hexagonal fuel rod array common to fuel assemblies. In reactors such as BWR's where assembly sleeves or channels are used to surround the rod array, the fuel rods with their attached sleeves as described herein could be simply placed inside the channel whereby the sleeves of the outer rows of rods would contact the channel inside wall and thus be contained. It should be also noted that the spacers are not affixed to spacer capture rods, tie rods or guide tubes (not shown) which function to connect the upper and lower tie plates. By not having the spacers connected to the fuel assembly tie rods, axial movement of the individual fuel rods is unrestricted and fuel rod bow is thereby minimized.

In addition to the above advantages, the assembly of the fuel rods with the integral spacer sleeve 20 into a fuel bundle is greatly simplified. Prior art methods involve inserting and interlacing each individual fuel rod into a complicated fuel assembly spacer during which the fuel cladding surface could be scraped by the spacer and thereby degrade the subsequent performance of the fuel cladding. Assembly of a fuel bundle consisting of fuel rods 100 and integral spacers 20 is easily accomplished by simply stacking the individual fuel rods with their welded spacers like pencils, one next to the other, without the risk of damaging or scratching any of the fuel cladding surfaces.

In order to further accommodate the reduction in diameter of the fuel rods due to creep, inward bent tabs 26A,B, 28A,B, 30A,B, can be shaped, cut or bent such that they meet the fuel rod at a desired angle α. The shallower the angle, the easier it will be for the rod to change diameter without creating large stresses in the tabs or in the fuel rod cladding. Thus, inwardly bent tabs 26, 28 and 30 shown in FIG. 6A form an angle α with fuel rod cladding 102 which result in a stiff configuration whereas the inwardly bent tabs in FIG. 6B result in a flexible configuration. In order to provide even greater flexibility, inwardly bent tabs 26, 28, 30 can be undercut so that when the tabs are bent inward as shown in FIG. 6C, a flexible arm 31 in addition to the angled inwardly bent tab 30 is available to accommodate the reduction in fuel rod diameter with the least amount of stress being created in the tabs or fuel rod cladding. In this arrangement, the end of inwardly bending tab 30 could be welded at 90° to the cladding surface to minimize flow restriction of the coolant.

Although the above description is limited to reactors using tubular fuel rods or fuel rods having circular cross-sectional areas, those skilled in the art will readily appreciate that the present invention can be utilized with all reactor types, core designs, fuels other than enriched uranium dioxide, and having individual fuel elements, sizes and configurations other than those which have been described above for purposes of illustration.

Various modifications of the above embodiments of the present invention can be easily accomplished depending upon the particular type of reactor, the position along the length of the fuel rod that the spacer is to be secured, or the particular purpose to be served.

While the present invention has been particularly shown and described with reference to preferred embodiments thereof, it will be understood by those skilled in the art that various changes in form and details may be made therein without departing from the spirit and scope of the invention.

I claim:

1. A spacer sleeve for positioning and restraining a nuclear fuel rod having an outer fuel rod cladding in a nuclear fuel assembly, said spacer sleeve comprising:
   a thin walled tubular member having an inner wall and an outer wall, the tubular member extending a height from a lower end to an upper end and being positioned around the fuel rod to form an unrestricted coolant flow passage along the height of the tubular member, the flow passage having across-sectional are formed between the fuel rod cladding and the inner wall of the tubular member;
   a first thin tab having a free end extending from the thin walled tubular member into the unrestricted flow area nd rigidly secured to a portion of the cladding of the fuel rod, said first tab being disposed toward the upper end of the thin walled tubular member; and
   a second thin tab having a free end extending from the thin walled tubular member into the unrestricted flow area and rigidly secured to a portion of the cladding of the fuel rod, said second tab being disposed toward the lower end of the thin walled tubular member.

2. The spacer sleeve as in claim 1 wherein at least one of said first and second tabs is secured to the cladding of the fuel rod by bonding.

3. The spacer sleeve as in claim 1 wherein at least one of said first and second tabs is secured to the cladding of the fuel rod by welding.

4. The spacer sleeve as in claim 3 wherein the sleeve is made form a material selected form the group of materials having a low thermal neutron cross-section.

5. A spacer sleeve as in claim 4, wherein at least one of said first and second tabs comprises a plurality of tabs, each one of said plurality of tabs being positioned to have their free end extend form the inner wall of the thin walled member to the fuel rod cladding, and said plurality of tabs being spaced a substantially equal number of degrees around the inner wall of the member.

6. A spacer sleeve as in claim 5 wherein at least one of said first and second tabs is integrally formed from the thin walled member.

7. A spacer sleeve as in claim 6 wherein at least one of said first and second tabs is positioned to extend into the unrestricted flow area at a aright angle to the coolant flow to impart the least amount of restriction to the coolant flow.

8. A spacer sleeve as in claim 3 wherein at least one of said first and second tabs is positioned to extend into the unrestricted flow area at a transverse angle to the coolant flow to impart a twisted helical motion to the coolant flow.

9. A spacer sleeve as in claim 8 wherein the tubular member is a hollow cylinder.

10. A spacer sleeve as in claim 9 wherein the outer wall of the hollow cylinder has at least one flat surface extending between the upper end and the lower end along the height of the member.

11. The spacer sleeve as in claim 10 wherein the at least one flat surface is four flat surfaces each one of said four flat surfaces positioned a substantially equal number of degrees around the perimeter of the outer surface of the member.

12. The spacer sleeve as in claim 10 Wherein the at least one flat surface is six flat surfaces each one of said six flat surfaces positioned a substantially equal number of degrees around the perimeter of the outer surface of the member.

13. A spacer sleeve as in claim 9 wherein the sleeve has an outer diameter which is equal to the fuel rod pitch.

14. A spacer sleeve as in claim 9 wherein the sleeve has an outer diameter which is greater than the fuel rod pitch.

15. The spacer sleeve of claim 5 wherein the thin walled tubular member is adapted to form at least one undercut which defines a flexible arm integrally connected to one of the said first and second tabs.

16. A fuel assembly for a nuclear reactor comprising a plurality of substantially parallel fuel rods having fuel cladding surrounding fissionable material, the fuel rods being supported vertically by two parallel end plates which are connected by structural elements, each of said fuel rods being positioned and maintained in a predetermined fixed lateral array in a uniform lattice in the assembly by a spacer sleeve system which comprises:

a plurality of spacer sleeves positioned at regular intervals along the length of each one of the fuel rods, respectively, whereby each one of the plurality of spacer sleeves along the lengths of the fuel rods are successively juxtaposed to the correspondingly positioned ones of the other spacer sleeves along the lengths of the other fuel rods, respectively, said correspondingly positioned spacer sleeves lying in common planes, respectively, the common planes being perpendicular to the longitudinal axis of said fuel assembly, each of said spacer sleeves comprising:

a thin walled tubular member having an inner wall and an outer wall, the tubular member extending a height from a lower end to an upper end and being positioned around the fuel rod to form an unrestricted coolant flow passage along the height of the tubular member, the flow passage having a cross-sectional are formed between the fuel rod cladding and the inner wall of the tubular member;

a thin tab extending from the thin walled tubular member into the unrestricted flow area, and having a free end secured to a portion of the cladding of the fuel rod; and said spacer sleeve system further including a strap extending around the periphery of the fuel assembly and engaging the spacer sleeves in one of said common planes at the periphery of the fuel assembly.

17. A fuel assembly for a nuclear reactor comprising a plurality of substantially parallel fuel rods having fuel cladding surrounding fissionable material, the fuel rods being supported vertically by two parallel end plates which are connected by structural elements, each of said fuel rods being positioned and maintained in a predetermined fixed lateral array in a uniform lattice in the assembly by a spacer sleeve system which comprises:

a plurality of spacer sleeves positioned at regular intervals along the length of each one of the fuel rods, respectively, whereby each one of the plurality of spacer sleeve along the lengths of the fuel rods are successively juxtaposed to the correspondingly positioned ones of the other spacer sleeves along the lengths of the other fuel rods, respectively, said correspondingly positioned spacer sleeves lying in common planes, respectively, the common planes being perpendicular to the longitudinal axis of said fuel assembly, each of said spacer sleeves comprising;

a thin walled tubular member having an inner wall and an outer wall, the tubular member extending a height for a lower end to an upper end and being positioned around the fuel rod to form an unrestricted coolant flow passage along the height of the tubular member, the flow passage having cross-sectional are formed between the fuel rod cladding and the inner wall of the tubular member;

a thin tab extending form the thin walled tubular member into the unrestricted flow area, and having a free ned secured to a portion of the cladding of the fuel rod; and said spacer sleeve system further including an outer channel extending around the periphery of the fuel assembly and engaging the spacer sleeves in one of said common planes at the periphery of the fuel assembly.

* * * * *